United States Patent
Harrill et al.

(10) Patent No.: US 10,261,757 B2
(45) Date of Patent: Apr. 16, 2019

(54) SYSTEM AND METHOD FOR AUTOMATED WEB PROCESSING SERVICE WORKFLOW BUILDING AND APPLICATION CREATION

(71) Applicant: Northrop Grumman Systems Corporation, Falls Church, VA (US)

(72) Inventors: Christopher Harrill, McLean, VA (US); Patrick Doody, Ashburn, VA (US); Zohra Hemani, Stone Ridge, VA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 232 days.

(21) Appl. No.: 14/206,988

(22) Filed: Mar. 12, 2014

(65) Prior Publication Data

US 2014/0282367 A1  Sep. 18, 2014

Related U.S. Application Data

(60) Provisional application No. 61/779,957, filed on Mar. 13, 2013.

(51) Int. Cl.
*G06F 8/30* (2018.01)

(52) U.S. Cl.
CPC ..................... *G06F 8/31* (2013.01)

(58) Field of Classification Search
CPC ..................... G06F 8/31; G06F 8/35
See application file for complete search history.

(56) References Cited

U.S. PATENT DOCUMENTS

| | | | |
|---|---|---|---|
| 6,915,454 B1 * | 7/2005 | Moore | G06F 11/0709 714/38.14 |
| 8,819,542 B2 * | 8/2014 | Cudich | G06F 17/21 709/203 |

(Continued)

OTHER PUBLICATIONS

Gong, et al., Building Integrated Cyberinfrastructure for GIScience through Geospatial Service Web, LIESMARS, Wuhan University, Aug. 7, 2012.

(Continued)

*Primary Examiner* — Li B. Zhen
*Assistant Examiner* — Mohammad H Kabir
(74) *Attorney, Agent, or Firm* — Katten Muchin Rosenman LLP

(57) ABSTRACT

A system and method for automated web processing service (WPS) workflow building and application creation are disclosed. Embodiments provide a web-based, graphical (e.g., HTML5/JavaScript-based) interface that is used to connect to WPS instances, view, edit and execute WPS processes, and chain together multiple WPS processes into an executable process workflow. The WPS chain links various processes to create a workflow for execution. Using this tool, WPS process execution requests may be serialized, saved, and loaded. Embodiments provide an easy way for analysts to chain multiple processes together to create advanced workflows without needing to write code. Embodiments make the process of connecting different WPSs simpler by allowing users to chain processes to form new workflows on-the-fly without the need to write code. Embodiments allow users to create new applications (apps) on-the-fly based on WPS workflows or chains without the need to write code.

18 Claims, 9 Drawing Sheets

(56) References Cited

U.S. PATENT DOCUMENTS

| | | | |
|---|---|---|---|
| 2004/0174397 A1* | 9/2004 | Cereghini | G06Q 30/02 715/855 |
| 2005/0021560 A1* | 1/2005 | Yoon | G09B 29/102 |
| 2006/0150178 A1* | 7/2006 | Jerrard-Dunne | G06F 8/71 717/168 |
| 2006/0212836 A1* | 9/2006 | Khushraj | G06F 17/30867 715/866 |
| 2007/0240080 A1* | 10/2007 | Eldridge | G06F 3/0486 715/835 |
| 2008/0178169 A1* | 7/2008 | Grossner et al. | 717/170 |
| 2009/0013244 A1* | 1/2009 | Cudich et al. | 715/234 |
| 2009/0013310 A1* | 1/2009 | Arner | G06F 8/38 717/120 |
| 2009/0222749 A1* | 9/2009 | Marinescu | G06F 8/20 715/764 |
| 2010/0050183 A1* | 2/2010 | Ogura | 718/106 |
| 2010/0220348 A1* | 9/2010 | Matsushima | H04L 67/02 358/1.13 |
| 2010/0229149 A1* | 9/2010 | Gella et al. | 717/101 |
| 2010/0317420 A1* | 12/2010 | Hoffberg | G06Q 30/0207 463/1 |
| 2011/0107227 A1* | 5/2011 | Rempell | H04L 51/046 715/738 |
| 2011/0119649 A1* | 5/2011 | Kand et al. | 717/100 |
| 2012/0047130 A1* | 2/2012 | Perez | G06F 8/34 707/723 |
| 2012/0317564 A1* | 12/2012 | Lee | G06F 8/61 717/175 |
| 2013/0047238 A1* | 2/2013 | Hwang | H04L 9/3228 726/7 |
| 2013/0159956 A1* | 6/2013 | Verghese | G06F 17/5036 716/122 |
| 2014/0047413 A1* | 2/2014 | Sheive | H04L 65/403 717/110 |
| 2014/0195938 A1* | 7/2014 | Cath | G06F 3/048 715/765 |

OTHER PUBLICATIONS

Stollberg, et al., "Development of a WPS Process Chaining Tool and Application in a Disaster Management Use Case for Urban Areas", University of Bonn, Germany, 8 pages, undated.

* cited by examiner

SYSTEM AND METHOD FOR AUTOMATED WEB PROCESSING SERVICE WORKFLOW BUILDING AND APPLICATION CREATION

CROSS REFERENCE TO RELATED APPLICATION

This application claims priority from U.S. Provisional Patent Application. No. 61/779,957, filed on Mar. 13, 2013, which is hereby incorporated herein by reference in its entirety.

BACKGROUND

The Open Geospatial Consortium (OGC) Web Processing Service (WPS) is a standard, web service, and XML-based interface to discover, describe, execute, and connect or chain various data and analysis processes. WPS is geared towards geospatial processes, but is generic enough to support any type of process.

Currently, chaining of WPSs together is a lengthy manual process that is difficult to debug due to nested XML. It is also difficult to visualize the entire workflow of WPSs. Hence, there is a need to simplify those processes and create a user interface for connecting the services easily with integrated error-checking to ensure the outputs and inputs are connected to the right data types and to visualize the entire workflow. There is also a need to automate the creation of applications (commonly referred to as "apps") from such WPS workflows.

Existing systems do not automate the workflows or the creation of apps from the workflows. Existing systems do not provide user interfaces with integrated error-checking that enable linking of the services and/or allow a user to visualize the entire WPS workflow graphically. For example, GeoServer™ is a software server that allows users to share and edit geospatial data. It also provides a mechanism to host WPS. GeoServer provides a capability to linearly create a nested chain but does not enable a user to get a complete look at the workflow process in one graphical view.

ESRI Model Builder™ is a desktop application that allows a user to create and execute models created from various tools within the ESRI ArcGIS toolbox of geographic information system (GIS) tools. The model itself can then be available as a tool itself in the toolbox. However, this is limited to working with the ESRI GIS tools and within the ESRI environment.

In Chapter 24 from the book entitled "Development of a WPS Process Chaining Tool and Application in a Disaster Management Use Case for Urban Areas" (authors are: B. Stollberg and A. Zipf, both are from Department of Geography, University of Bonn, Germany, copyrighted 2009), the concept of developing a desktop application to perform WPS chaining is discussed. This concept is, however, limited in its application and does not provide a web-based interface or other needed features such as auto creation of apps.

There is also currently GeoChaining capability that is part of the GeoSquare capability developed by LIESMARS, Wuhan University. This GeoChaining capability also creates models based on geospatial services. However, this implementation is also limited to a desktop-based capability without the web-based interface or other needed capabilities and features such as auto creation of apps. A recent slide presentation entitled, "Building Integrated Cyberinfrastructure for GIScience through Geospatial Service Web", which is available online (authors of the slide presentation are: Jianya Gong, Tong Zhang, Huayi Wu, and Yandong Wang from LIESMARS, Wuhan University, Conference: Cyber-GIS '12 at University of Illinois at Urbana-Champaign, dated Aug. 7, 2012), provides a description of the capability.

Currently, there is no automated way to create analysis applications without writing code. Accordingly, there is a need for users such as analysts to easily make their analysis workflows available to end users without having another person (i.e., a middleman) write code for a graphical user interface that can interact with the said workflows.

With the rise in popularity and widespread adoption of advanced smart phones and their associated platforms, apps have become a popular paradigm for creating simple, intuitive, and powerful tools accessible through a variety of computer form factors. Apps and their associated app stores are reflective of an on-demand environment where information and tools need to be timely, customizable, and responsive. There are well over 1 million apps in Apple, Microsoft, and Google's app stores. Unfortunately, users cannot access the processes that make up these apps.

SUMMARY

Embodiments are directed to a computer-implemented method for automated web processing service (WPS) workflow building and application creation. The method includes: connecting to multiple WPS instances; displaying processes exposed by the WPS instances; receiving selection of one or more of the displayed processes; providing a visual representation of a process chain of the selected one or more processes; receiving selection of one or more outputs in the process chain; connecting the selected one or more outputs to compatible inputs in the process chain; receiving data related to the properties of the selected inputs and outputs; creating a workflow based on the process chain, selected outputs, connected inputs and received property data; creating an application from the created workflow; and exporting the created application.

The creating an application may include naming the application; describing the application; categorizing the application; modifying a name, description, or default value of one or more process input parameters; and creating the application as a standalone app (e.g., web app), Ozone™ framework app, or a portal application (e.g., web portal application).

Embodiments are also directed to a non-transitory computer readable medium storing instructions, executable by a processor, for automated web processing service (WPS) workflow building and application creation. The instructions include instructions for performing the above-mentioned method.

Embodiments are further directed to a system for automated web processing service (WPS) workflow building and application creation. The system includes a processor and a memory, wherein the processor executes instructions on the memory to generate a graphical user interface that includes: a process panel that allows a user to connect to multiple WPS server instances, search for and view processes exposed by those WPS server instances, select one or more processes in order to add the selected process to a diagram/canvas, and to enter a WPS Server uniform resource locator (URL) or select a source from a list of available servers; the diagram/canvas that provides a visual representation of a process chain and that enables selection of an output in order to connect the output to a compatible input; a property panel that displays the inputs and outputs for the process that is currently selected by the user, wherein the property panel enables the user to execute processes to preview workflow results and save a workflow created from the executed processes and other inputs; and a menu selection that enables a user to create an application from the workflow created using the process panel, diagram/canvas and property panel.

BRIEF DESCRIPTION OF THE DRAWINGS

For the present invention to be clearly understood and readily practiced, embodiments will be described in conjunction with the following figures, wherein.

The detailed description will refer to the following drawings in which like numerals refer to like items, and in which.

DETAILED DESCRIPTION

Figure 1:
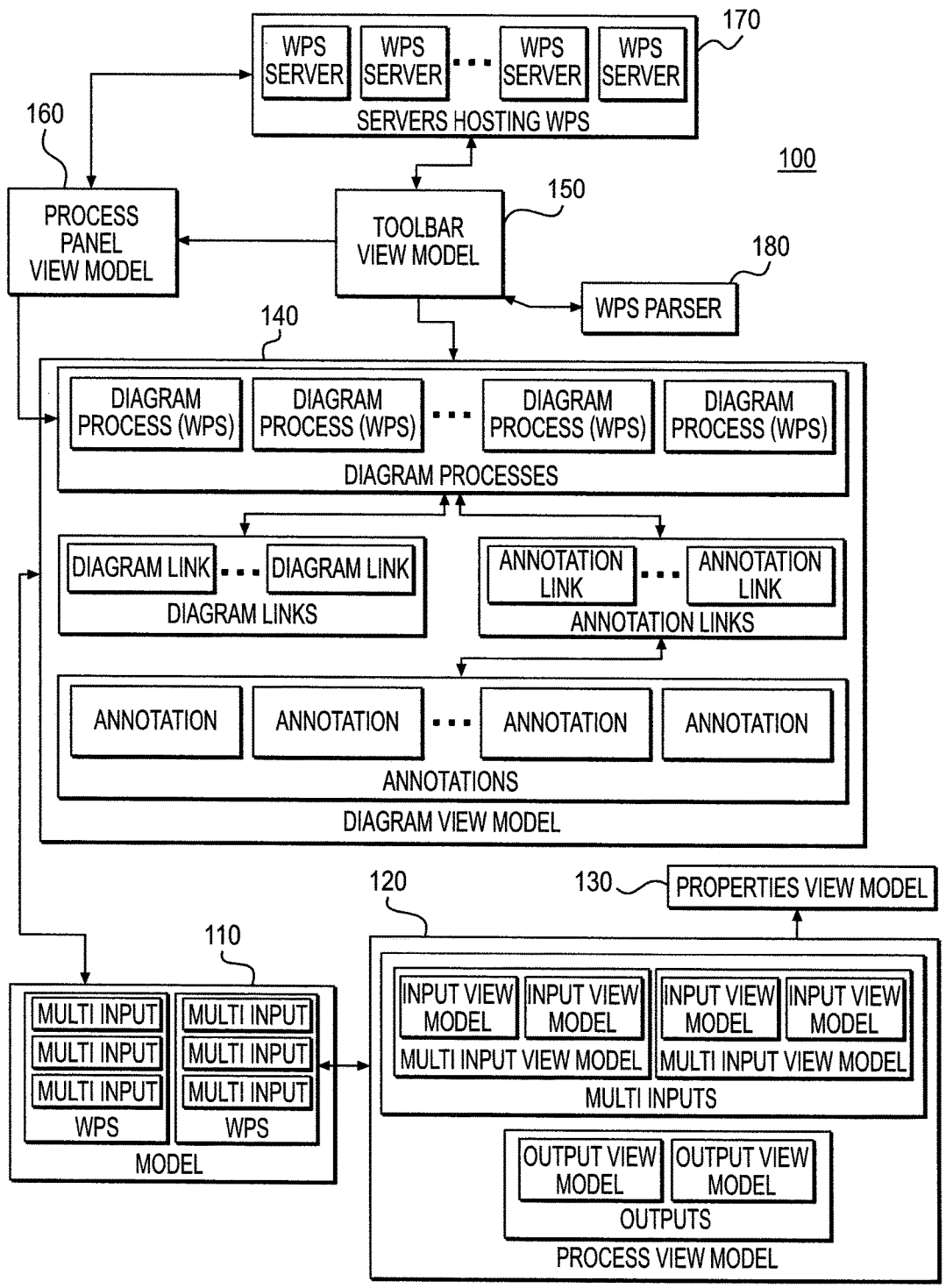
FIG. 1 is a diagram illustrating an exemplary architecture of an embodiment of the WPS Workflow Builder.

It is to be understood that the figures and descriptions of the present invention may have been simplified to illustrate elements that are relevant for a clear understanding of the present invention, while eliminating, for purposes of clarity, other elements found in a typical WPS and app creation system or typical WPS and app creation method. Those of ordinary skill in the art will recognize that other elements may be desirable and/or required in order to implement the present invention. However, because such elements are well known in the art, and because they do not facilitate a better understanding of the present invention, a discussion of such elements is not provided herein. It is also to be understood that the drawings included herewith only provide diagrammatic representations of the presently preferred structures of the present invention and that structures falling within the scope of the present invention may include structures different than those shown in the drawings. Reference will now be made to the drawings wherein like structures are provided with like reference designations.

Described herein are systems and methods for automated web processing service (WPS) workflow building and application creation. Embodiments, which may be referred to as WPS Workflow Builder, provide a web-based, graphical (e.g., HTML5/JavaScript-based) interface that is used to connect to WPS instances, view, edit and execute WPS processes, and chain together multiple WPS processes into an executable process workflow. The WPS chain links various processes to create a workflow for execution. Using this tool, WPS process execution requests may be serialized, saved, and loaded. Embodiments provide an easy way for users such as analysts to chain multiple processes together to create advanced workflows without needing to write code.

Embodiments of the WPS Workflow Builder make the process of connecting different WPSs simpler by allowing users to chain processes to form new workflows on-the-fly without the need to write code. Embodiments include integrated error-checking capability that prevents users from connecting incorrect or incompatible inputs/outputs from the start. The web-based nature of the capability provides easy access via a browser without the need to install any software. Builds upon WPS services that have already been created and published—for example, embodiments do not require creation of a central repository.

Embodiments, using WPS as the basis, allow users to create new applications (apps) on-the-fly based on WPS workflows or chains. Such embodiments, which may be referred to as "App Creator", provide an easy way for users such as analysts to create advanced analytic apps for other users without the need to write code. The App Creator and the WPS Workflow Builder may be linked or otherwise implemented together as one embodiment of a system and method for automated WPS workflow building and application creation. Alternatively, the App Creator and the WPS Workflow Builder may be implemented as separate implementations.

Innovative aspects of the embodiments described herein include the WPS Workflow Builder, provide a web-based, graphical interface that is used to connect to WPS instances, view, edit and execute WPS processes, and chain together multiple WPS processes into an executable process workflow without the need to write code. Innovative aspects of the embodiments described herein also include the App Creator which exports the executable process workflow (which contains the multiple WPS processes) obtained from the WPS Workflow Builder and creates an app therefrom. These innovative aspects provide a system and method that visually present available processes for selection by a user, enable a user to link processes together (e.g., by connecting outputs of processes to inputs of processes) thereby forming a process flow, obtain the necessary data for process inputs, encapsulate the data and process flow, build an application with an executable process flow and export the application as a ready-to-use application without needing additional code writing or other input from the user.

The App Creator makes the process of creating new applications very easy without the need to write any code. Creation of apps no longer requires someone with specialized skill set (programmer). Rather, a non-programmer may create an application in a matter of minutes instead of hours or days. Without the App Creator, it takes a programmer multiple hours or days to write an application whereas with this capability, a non-programmer may create an application within a matter of minutes.

Embodiments may provide the option to turn the workflows or WPS chains into apps. These apps may be stand-alone apps, portal-specific apps (e.g., GeoHome apps available in the Northrop Grumman Corporation (NGC) app store), or widgets (e.g., Ozone™ widgets). Stand-alone app may run on its own in a browser, incorporated into Ozone™ or other environments. An analyst may customize what an app user would see when using the exported app including the name, description and parameter information along with specifying certain inputs as default versus others as user-defined at run time. The stand-alone app that is created may also have an open source map built into it to allow users to specify geospatial input features.

With reference now to FIG. 1, shown is an illustration of an embodiment of the WPS Workflow Builder 100, providing a summary illustration of an exemplary architecture of an embodiment of the WPS Workflow Builder 100. WPS Workflow Builder 100 may provide a browser-based capability developed in HTML5 that allows a user to connect distributed WPS services on-the-fly to create, edit, manage and execute advanced workflows for data and analysis processing. An embodiment of the WPS Workflow Builder 100 follows a Model-View-View Model (MVVM) architectural pattern. Other patterns may alternatively be utilized. The MVVM pattern promotes a separation between the data (model), the presentation (view), and the logic connecting the two (view model). In an embodiment, the presentation is handled by and through HTML and the Kinetic JavaScript HTML5 Canvas JavaScript library, the presentation logic includes a collection of JavaScript classes acting as view models through the Knockout.js library, and the data is maintained in a separate JavaScript class. Other libraries and classes, as well as programming languages, may be used in embodiments. The architecture shown in FIG. 1 summarizes JavaScript including view models and a model of the Workflow Builder 100. The architecture of Workflow Builder 100 includes the following components (which may be implemented as software modules in an embodiment of WPS Workflow Builder 100):

Model 110: Model 110, and all of the other models described below, may be implemented as a Java class instantiated as an object. In an embodiment, Model 110 is an object that holds and maintains all of the data (i.e., without function associated with the data) and structure of the workflow for the application being built. Model 110 may maintain the structure of the workflow (i.e., what the WPS processes made available to the user are and how they are connected) in the form of trees of WPS processes. Each WPS process within the Model 110 contains a collection of MultiInputs which each represent one or more inputs to the WPS process.

ProcessViewModel 120: ProcessViewModel 120 connects how the data (maintained in the model 110) of the application is to be presented to the user and provides the functionality of the behavior of the application. There is a one-to-one correspondence between each WPS process in the Model 110 and a ProcessViewModel 120. The ProcessViewModel 120 handles the connection between displaying the properties of a particular WPS process (through the PropertiesViewModel 130) and updating the WPS process with any changes the user makes to these properties. The ProcessViewModel 120 is comprised of a collection of one or more MultiInputViewModels—which each contain one or more InputViewModels—and a collection of OutputViewModels. These internal view models (InputViewModels and OutputViewModels) each relate to a component of the associated WPS process. Each InputViewModel corresponds to an input of a WPS process. Each OutputViewModel corresponds to an output of a WPS process. MultInputViewModels correspond to WPS processes with multiple inputs.

DiagramViewModel 140: DiagramViewModel 140 is a model that indicates how the WPS processes are displayed to the user. The DiagramViewModel 140 maintains a collection of DiagramProcesses and DiagramLinks as the view model connecting the diagram (the display of the selected WPS processes—see Diagram/Canvas 204 in FIGS. 2A-2C) to the Model. DiagramProcess is the visual element of a WPS process to be displayed to the user (on a display screen—see FIGS. 2A-2C). DiagramLinks are visual elements representing connections made between WPS processes by the user. Each DiagramProcess corresponds to a WPS process present in one of the process trees maintained by the Model. The DiagramViewModel 140 also maintains a collection of Annotations and AnnotationLinks that allow a user to make notes on the diagram and connect them to DiagramProcesses. Annotations are notes that a user enters. AnnotationLinks are links that connect the Annotations to the DiagramProcesses.

ToolbarViewModel 150: The ToolbarViewModel 150 is a view model bound to the toolbar (of the interface of the Workflow Builder see FIG. 2A) at the top of the view. For each function in this toolbar, the ToolbarViewModel 150 defines the action to take when the function is selected. The ToolbarViewModel 150 may interact with the DiagramViewModel 140 directly, for example by automatically laying out the diagram or adding DiagramProcesses when loading a saved workflow, and with the Model indirectly, through the DiagramViewModel 140. The ToolbarViewModel 150 also communicates with the ExportViewModel (not shown) to export the workflow as an external app and the ProcessPanelViewModel 160 to load a list of available WPSs from a server. The ToolbarViewModel 150 may also utilize a WPS Parser 180.

ProcessPanelViewModel 160: ProcessPanelViewModel 160 is a component that accesses WPS services (e.g., servers containing WPS processes available for use in building an application using embodiments described herein), obtains a list of WPS process available from the WPS services, presents the list to the user (e.g., using the displays shown in FIGS. 2A-2C), receives user selection of WPS processes and connections of WPS processes, adds the selections to the diagram and builds the WPS process chain. The ProcessPanelViewModel 160 is able to access external servers 170 hosting WPSs to load those services, and then add these services to the DiagramViewModel.

In the embodiment shown, the architecture illustrated in FIG. 1 is a client-side architecture. In the embodiment shown, the presentation of the Workflow Builder 100 is primarily defined in index.html with data-bindings to the view models discussed above. In an embodiment, the canvas elements used in the diagram are accomplished in JavaScript through the Kinetic JavaScript HTML5 Canvas JavaScript library. Other libraries and classes, as well as programming languages, may be used in embodiments. In an embodiment, there are three (3) handlers working on a server-side to support the Workflow Builder 100 functionality. These three handlers (not shown) are:

proxy.ashx: The proxy.ashx handler routes all requests associated with describing or executing WPSs.

download.ashx: The download.ashx handler exists to allow the user to locally save a workflow. Because disk I/O is not possible in JavaScript, the client uploads the text of the saved workflow where the server creates a file, which is then downloaded by the client.

export.ashx: The export.ashx handler allows an app generated by the client to be exported to the specified server.

Figure 2A:
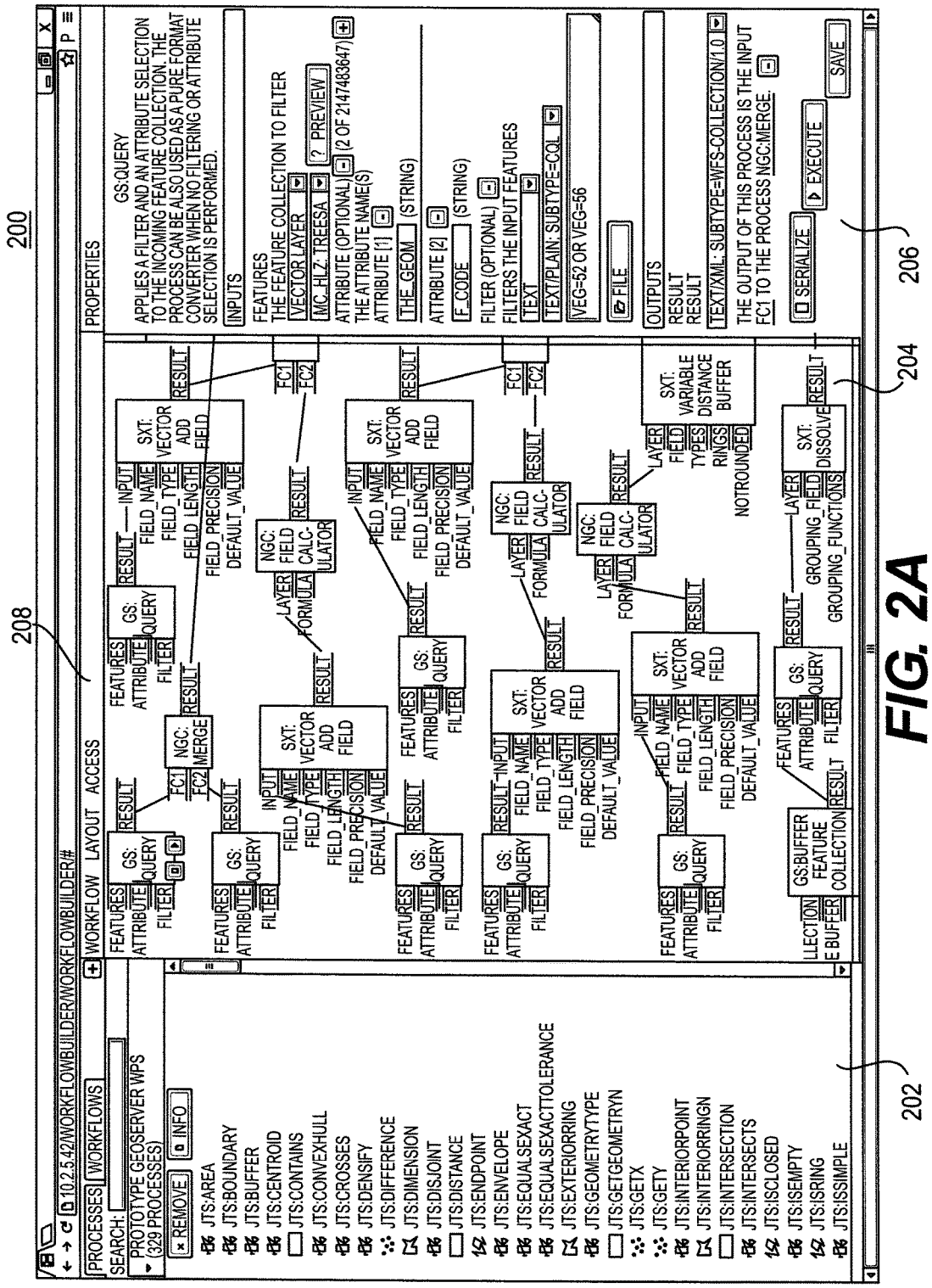
FIGS. 2A-2C are screenshots illustrating an embodiment of the WPS Workflow Builder graphical user interface (GUI).

With reference now to FIG. 2A, shown is an embodiment of a WPS Workflow Builder graphical user interface (GUI) 200. The embodiment of the Workflow Builder GUI 200 includes three primary components or display panels, moving from left to right. These display panels may be instantiated and run by corresponding software modules in an embodiment of WPS Workflow Builder 100. These display panels are:

- Process Panel 202—the process panel 200 component allows a user to connect to multiple WPS instances and view the processes exposed by those WPS instances. The user may also search for processes using the search tool (e.g., a search box) at the top of the process panel 202. Users may click on or drag and drop a process in order to add it to the diagram/canvas 204. Clicking the plus/add button in the upper-right of the process panel 202 displays a popup window that allows the user to enter a WPS Server uniform resource locator (URL) or select a source from a list of available servers.
- Diagram/Canvas 204—the diagram/canvas 204 component provides a visual representation of a process chain. In an embodiment, each process is represented by a rectangle with the process inputs appearing along the left of the rectangle and the process outputs appearing along the right side of the rectangle. Users may click on an output in order to connect it to a compatible input. Incompatible inputs are disabled when the connection line is being dragged from a given output. Integrated error-checking capabilities automatically prevent users from connecting incompatible outputs to a given input parameter.
- Property Panel 206—the property panel 206 component displays the inputs and outputs for the process that is currently selected by the user. Users may enter text, draw on the available map for input map data, or select files as input and choose appropriate input and output formats. Users may also serialize process requests and execute processes from this component to preview workflow results.

A toolbar 208 spans the interface 200 along the top of the three components described above. The toolbar 208 includes functions for serializing and executing models, clearing the diagram/canvas 204, saving/loading a workflow/process chain, and automatically arranging a workflow on the canvas 204. These functions may be alternatively presented in the Process Panel 202, Diagram/Canvas 204, or Property Panel 206.

Figure 2B:
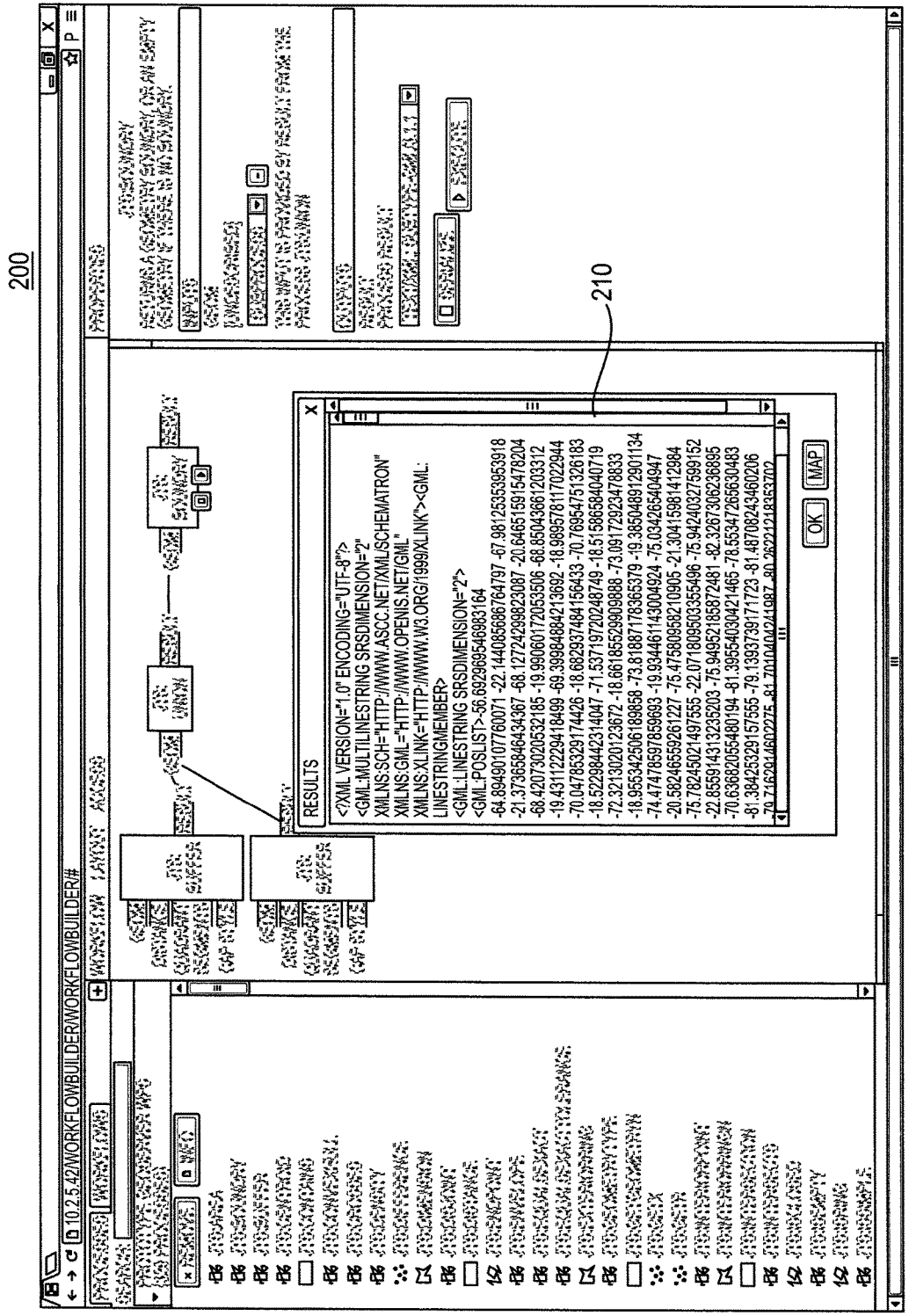

An execute function on the toolbar 208 or in the property panel 206 may be clicked or pressed to execute a selected process or process chain. This sends the process execution request to the WPS associated with the selected process/process chain. Any process in a process chain may be executed at any time, allowing the user to see intermediate results. A results window 210, e.g., as illustrated in FIG. 2B, may appear as a pop-up or other window once the server responds to the process execution request. A map results window 212 geographically illustrating the results, e.g., as illustrated in FIG. 2C, may also appear as a pop-up or other window once the server responds to the process execution request and a user selects option to map the results.

Figure 2C:
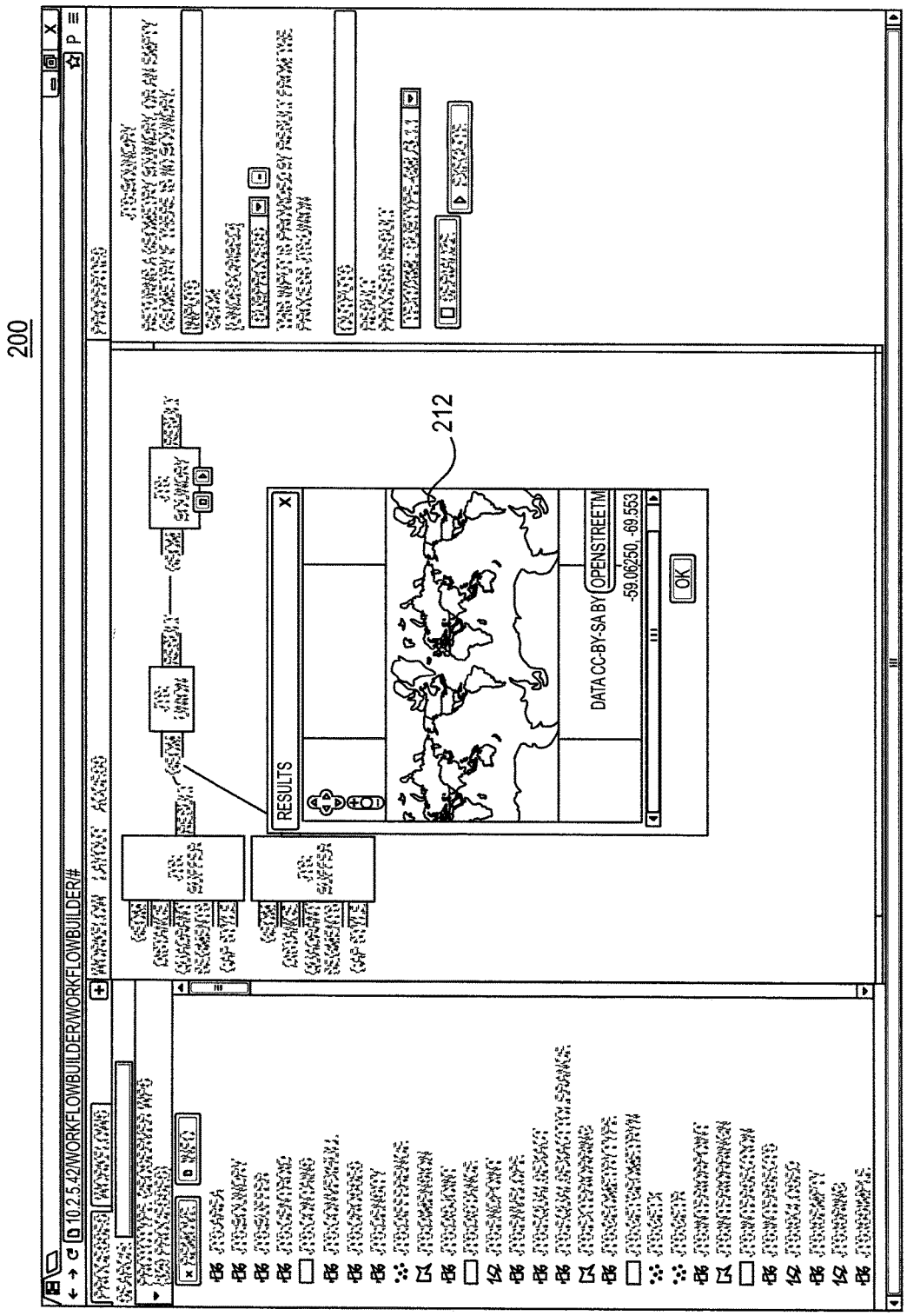

With continuing reference to FIGS. 1-2C, in an embodiment the WPS Workflow Builder GUI 200 and WPS Workflow Builder 100 code may include several main components:

- Model (e.g., Model.js)—the Model class is the underlying model class that represents the chain of processes that the user has constructed.
- Toolbar 208 (e.g., toolbar.js/toolbar.css)—as discussed, the toolbar 208 is the top strip of the WPS Workflow Builder GUI 200. The toolbar 208 may include functions for serializing and executing models as well as loading models and performing auto-layout.
- Process Panel 202 (e.g., processPanel.js/processPanel.css)—as noted, the process panel 202 is the left panel of the WPS Workflow Builder GUI 200. The process panel 202 may include a jQuery UI accordion component with an accordion panel for each WPS server instance that a user has loaded. Users may add a WPS server by clicking the plus button in the upper right hand of the process panel 202.
- Diagram/Canvas Panel 204 e.g., (diagramPanel.js/diagramPanel.css)—as noted, the diagram/canvas panel (or diagram/canvas) 204 is the middle panel of the WPS Workflow Builder GUI 200. In an embodiment, the diagram/canvas 204 may include an HTML div element that gets bound to by Kinetic JavaScript. Kinetic JavaScript may then create canvas elements within this div element. Other libraries and classes, as well as programming languages, may be used in embodiments. The diagramPanel.js file may also include a diagram class which provides methods for manipulating the diagram and the underlying model (e.g., adding processes, deleting processes, etc.)
- Property Panel (e.g., propertyPanel.js/propertyPanel.css)—as noted, the property panel 206 may display the properties (description, inputs, and outputs) for a user selected process.
- Market Manager (marketmanager.js)—the market manager class may be used to interact with various online app stores, (e.g., the NGC GeoHome Marketplace). The market manager may use the jQuery AJAX functionality to make calls to the marketplace.
- Config Manager (e.g., configmanager.js)—the config manager class may be used to load global configuration information for WPS WorkflowBuilder. In an embodiment, this information includes a proxy URL, default timeout, market URL, and username and password for the market. The config manager may also be used for selecting services that will be referenced by processes (e.g., if the user wanted to use the output from a WFS as input to a process).

| Name | URL | Description |
| --- | --- | --- |
| jQuery | http://jquery.com/ | Widely used framework/functions for AJAX and easy DOM manipulation |
| jQuery UI | http://jqueryui.com/ | UI Components based on jQuery. Used for buttons, accordions, resizing, drag and drop, dialogs, etc. within the ModelBuilder UI. |
| Kinetic JS | http://www.kineticjs.com/ | HTML5 canvas library - used for drawing process diagrams and connecting processes. |
| Knockout JS | http://www.knockoutjs.com | Used for databinding in the property panel |
| OpenLayers | http://www.openlayers.org | Used for allowing users to enter geospatial data into processes and for displaying geospatial results |

As shown in the following table, embodiments of Workflow Builder 100 may make use of several external libraries for providing various functions:

One of ordinary skill in the art will recognize that embodiments of the WPS Workflow Builder 100 may be implemented in different manners, using different programming languages then described above. As noted above, the WPS Workflow Builder 100 makes the process of connecting different WPS simpler by allowing the users to chain processes to form new workflows on-the-fly without the need to write code. The integrated error-checking described above prevents users from connecting incorrect inputs and outputs. The web-based nature of the WPS Workflow Builder 100 provides easy access via a browser without the need to install any software. The WPS Workflow Builder 100 builds upon existing WPS services, obviating the need to create a central repository and providing other advantages. Embodiments have been used to create various process workflows in a fraction of the time previously needed. For example, in tests, developing a helicopter landing zone workflow using the WPS Workflow Builder 100 was accomplished in a matter of minutes where doing by hand took several days. This was due in large part to the difficult aspect of debugging any errors while performing the manual workflow building.

Application creation embodiments allow users to export their WPS chains/workflows as separate, stand-alone applications (e.g., web applications), Ozone™ Widgets (or other widgets) or portal (e.g., the NGC GeoHome Portal) applications. Such WPS chains/workflows may have been built by WPS Workflow Builder 100. Embodiments package the WPS chain/workflow as an application and automatically generate a graphical user interface (GUI) for stand-alone Web applications. The application is then created and may be made available on any specified server or marketplace. Below is a description of an illustrative flow of events for an embodiment:

When the user chooses to create an application, a menu pops up and prompts the user to fill in information about the application:

Application Name: This is the name of the application that will be visible to the application end-users and will appear on the server and app store/online marketplace (e.g., the NGC GeoHome Marketplace) on which the application is made available.

Description: The description of the application that the end-user will see.

Category: Describes the type of analysis being completed by the application.

Inputs: This allows the user, if any inputs had the User Input check box checked, to provide more detailed information about that input. The User Input check box may be checked when the creator of the app wants to give the option to the end user to enter/modify a certain input parameter. The user (creator of the app) may modify the name, description, and default value of any input parameter. This allows end-users of the exported application to have more detailed descriptions about a WPS input—due to the fact that many WPS processes lack descriptive variable names and descriptions.

Color: The color theme of the exported application.

When the user has filled in the appropriate field descriptions, the user clicks 'Next' to enter in their credentials and export the application to a server and/or to make it available on an app store/online marketplace (e.g., the NGC GeoHome Marketplace). Depending on how the application was exported, the application may work as either a standalone app, within the Ozone™ framework or within a portal (e.g., the NGC GeoHome Portal) and it will interact with the appropriate map to collect inputs and display the results.

From the exported application, the user may click Execute which will execute the WPS process chain and the results will be drawn to an output pane, and if able, also to the appropriate map.

The App Builder allows users to export their WPS models as separate, stand-alone Web applications, portal (e.g., the NGC GeoHome portal) applications or Ozone™ widgets (or other widgets). This is done by choosing the 'Export Application' option at the top menu. With the appropriate portal (e.g., GeoHome) credentials, a user may begin the process to package the WPS model as an application, and a GUI for a portal web application will automatically be created and added to the market. This application will then be available to all portal (e.g., GeoHome) users.

Figure 3:
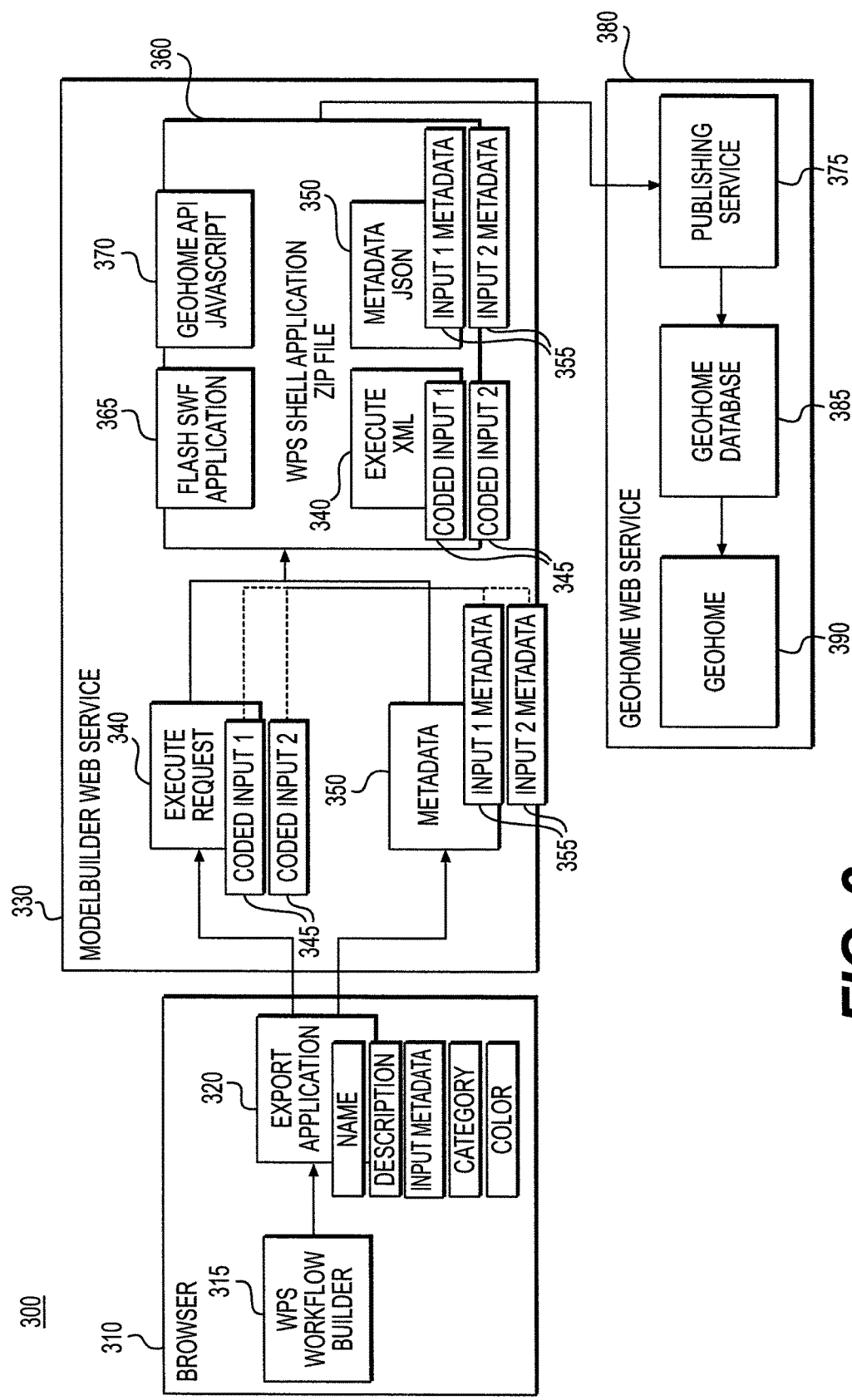
FIG. 3 is a flow diagram illustrating a system and method for automated WPS application creation implemented by an embodiment of the App Builder.

With reference now to FIG. 3, shown is a flow diagram illustrating a method 300 for automated WPS application creation implemented by an embodiment of the App Builder. As shown in the automated WPS application process 300 illustrated in FIG. 3, in an embodiment combining the App Builder with the WPS Workflow Builder 315. Components of App Builder and WPS Workflow Builder 315 are shown in FIG. 3. The method 300 for building an application processes are as follows.

A user selects an options menu from the toolbar (e.g., toolbar 208) in browser 310, and selects an Enable Portal (e.g., GeoHome) Inputs checkbox. This selection will enable each input, as described above in the right-hand property panel 206, to be checked as a portal (e.g., GeoHome) input. This means that when the current model is exported, the selected value will be presented as an option to the user from within the exported application. The benefit of this is to allow the user flexibility when exporting WPS Models, so that users of the exported application may modify certain parameters or values to the Execute request.

In browser 310, the user selects an Export Application menu item. A menu pops up (e.g., js/ui/ExportViewModel.js) for entering inputs for processing by an Export Application module 320 and prompts the user to fill in information about the application. This information input received by the Export Application 320 may include:

Application Name: This is the name of the application (e.g., that will appear in the GeoHome Marketplace).

Description: The description of the application (e.g., that will appear in the GeoHome Marketplace).

Category: Describes the type of analysis being completed by the application.

Inputs (Input Metadata): This allows the user, if any inputs had their Portal (e.g., GeoHome) Input check box checked, to provide more detailed information about that input. The user may modify the name, description, and default value of any input. This allows users of the exported application to have more detailed descriptions about a WPS input—due to the fact that many WPS processes lack descriptive variable names and descriptions. For example, in a JTS:Buffer, the geometry is simple labeled as geom. When exporting as an app, however, this may be renamed to something more friendly and descriptive such as the plume model to be buffered.

Color: The color theme of the exported application.

When the user has filled in the appropriate descriptions, the user may click next to enter in the user's portal (e.g., GeoHome) credentials in the next window (e.g., js/ui/ExportServerViewModel.js). In the next window there may be a drop-down list of all portal (e.g., GeoHome) servers pulled from a config.json file. The user selects a server, types in their credentials, and hits export to export the user's inputs and selections to a Model-Builder Web Service 330. ModelBuilder Web Service 330 is an expanded illustration of the export application 320.

Upon clicking export, an export.ashx service is called. This service is illustrated as FIG. 3 as the ModelBuilder Web Service 330. With continued reference to FIG. 3, this service collects the users inputs, and may process the inputs as follows:

From WPS Workflow Builder server, template files for the exported application may be copied into a temporary working directory located under a server directory.

The template files (or simply the "template") acts as the shell of the exported application. The template contains the logic to construct a GUI, inputs, and procedures for rendering results, and is dynamically created by the inputs that the user specified. For example, this logic may include a Flash SWF application file (i.e., a .swf file), a GeoHome API JavaScript, an Execute XML (XML Request) file, and a Metadata JSON. The shell application may be located in source, e.g., under GeoHome Web/src/widgets/WpsShell. The shell may depend on two core files:

wps.xml: This is an execute XML request (shown as Execute Request (Execute XML) 340), as defined by the user's WPS Model. The serialized Execute Request 340 is something that may be posted to a WPS server—with one difference. Each input is given a Globally Unique Identifier (GUID), or a unique ID. This is shown by the Coded Inputs 345. The shell application will use this GUID to match up the metadata for that input, with the input itself.

wps.xml.json: This is the metadata JSON file (shown as Metadata 350) that is constructed from the user-defined inputs as typed in via the Export Application menu. The Metadata 350 includes the Input Metadata 355 received from the user inputs (see above) and matched up or linked to the Coded Inputs 345 as described above.

The content of this temporary directory, including the two defining files (Execute Request 340 and Metadata 350), may be compressed into a zip file (e.g., WPS Shell Application zip file 360). In an implementation, the WPS Shell Application zip file 360 includes Execute Request (Execute XML) 340, Coded Inputs 345, Metadata (Metadata JSON) 350, Input Metadata 355, Flash SWF Application 365, and GeoHome API JavaScript 370. The WPS Shell Application zip file 360 may then be posted to a publishing service (e.g., GeoHome Publishing service 375) as running in an AppStore web service (e.g., GeoHome Web service 380). The publishing service 375 will extract the contents of the WPS Shell Application zip file 360 into a directory, e.g., webapps/GeoHome/widgets/directory, and add the appropriate entries into a database, e.g., GeoHome Database 385. This is what will enable the application to be a part of, e.g., the GeoHome Marketplace.

With continuing reference to FIG. 3, the user may then log into a portal (e.g., GeoHome 390), and bring up a list of apps in the GeoHome Marketplace. The exported application should be visible in the list. By clicking the application and clicking install the user may bring up the exported application. This application may interact with a map (e.g., a GeoHome map) by collecting inputs from the map, collecting literal inputs, and rendering results to the map.

From the exported application, the user may click the Serialize button to view the serialized Execute XML. This is the raw XML that will be posted to a WPS server instance. From the exported application, the user may also click Execute which will perform the post to a WPS server instance (e.g., any WPS implementation, such as a GeoServer instance), with the Execute process as the post data. The results will be drawn to the output pane, and if able, also to a map (e.g., a GeoHome map).

Embodiments of the App Builder and WPS Workflow Builder provide many advantages over the prior art. When integrated together into one implementation, embodiments facilitate and support the chaining of existing processes and applications via a graphical and user-friendly interface that allows the quick development and release of new workflows that may be systematically exported as services and/or applications. The resultant platform-independent (e.g., HTML5) apps may function as server-based applications accessed via the Ozone™ or enterprise web framework and used via workstations or mobile devices. This innovative approach dramatically increases value of the users, developers, and subject matter experts by significantly decreasing or deleting development time to create an extensive library of applications. Developers can focus on creating basic building block processes and the users (e.g., analysts) may combine them into meaningful workflows and export as relevant apps. Embodiments provide significantly quicker access to analytical apps across the organization rather than waiting for a developer or programmer to develop code for an app. As new processes are added to the WPS library, applications (existing or new) may be developed or modified to take advantage of the expanded service listing.

Consider the following use case. A user needs to routinely perform terrain analysis to generate a route. The analysis needs to take into account any load-bearing constraints of bridges. Several apps may exist that will perform a terrain analysis or perform a load calculation, but to perform the complete analysis a new app would need to be designed and integrated to automate the analytics. With the embodiments described herein, the user may create a new app on-the-fly that will chain the processes to analyze terrain with a route planner app to form a new app that integrates a third load-bearing process.

Figure 4:
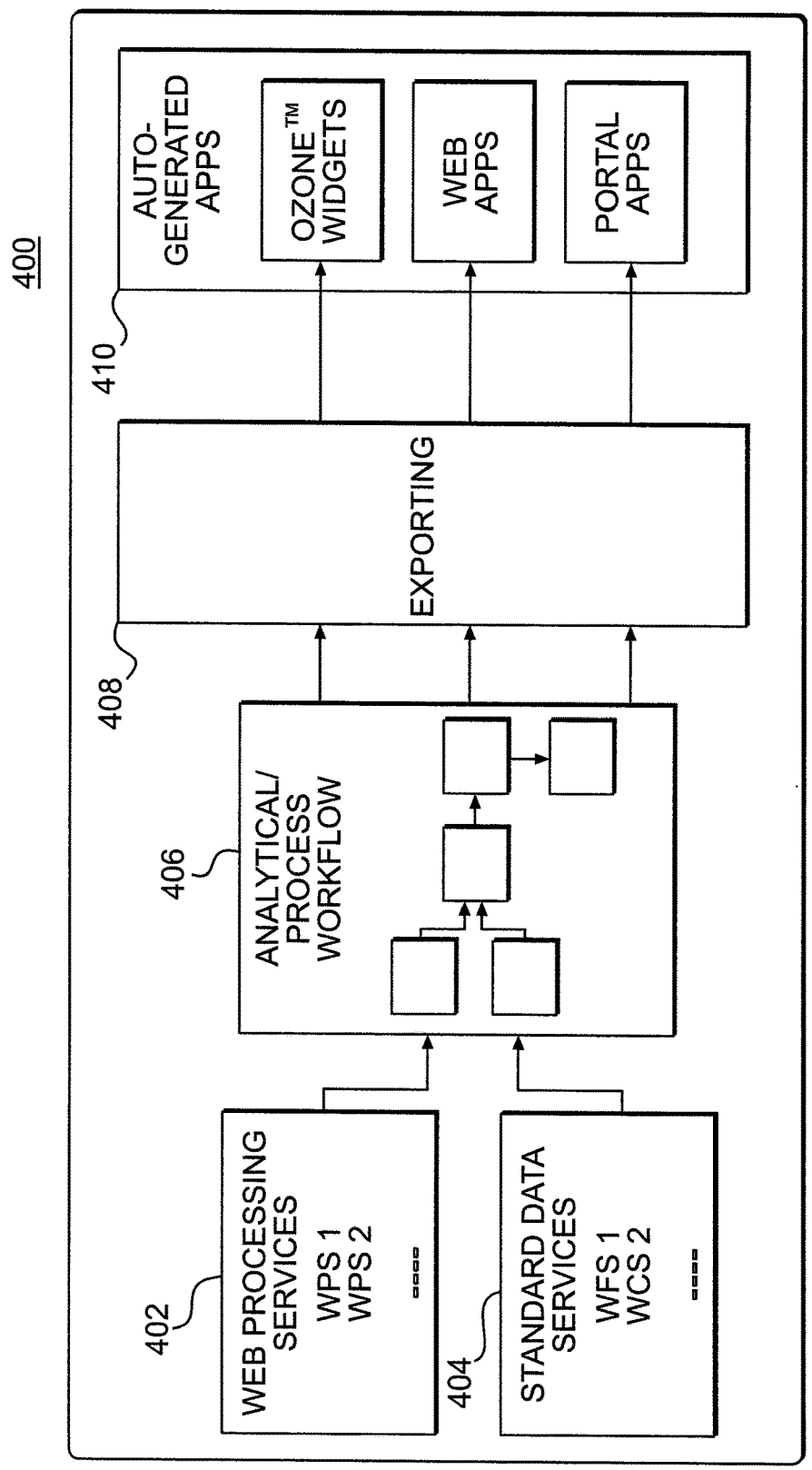
FIG. 4 is a flow diagram illustrating an embodiment of a combined system for automated WPS workflow building and application creation.

As illustrated in FIG. 4, which illustrates an embodiment of a combined system 400 for automated WPS workflow building and application creation, embodiments allow a user to access and store a limitless number of WPS processes and workflows, with the ability to export apps in a structured process. The process does not limit the correlation between apps or workflows or limit the data that may be ingested and used. By allowing users to create their own apps according to individual workflows, integration and customization is performed by the user in real time, establishing a framework that allows the creation of new analytics regardless of data type. As shown in FIG. 4, system 400 includes Web Processing Services 402, Standard Data Services 404, Analytical/Process Workflow 406, Exporting 408, and Auto-Generated Apps 410. Web Processing Services 402 represents servers with WPS processes WPS 1 and WPS2 that may be selected for the application being built. Standard Data Service 404 represent servers with available data such as Web Feature Service (WFS) 1 and Web Coverage Service (WCS) 2 that may be selected for the application being built. Analytical/Process Workflow 406 illustrates the workflow building of processes of the WPS Workflow Builder 315 in FIG. 3 using the selected WPS processes (e.g., WPS 1 and WPS 2) and selected data (e.g., WFS 1 and WCS 2) as input. Exporting 408 of built applications corresponds to the export application 320 in FIG. 3. Auto-Generated Apps 410 illustrates exemplary apps deployed on multiple platforms that are built according to the processes described above.

Figure 5A:
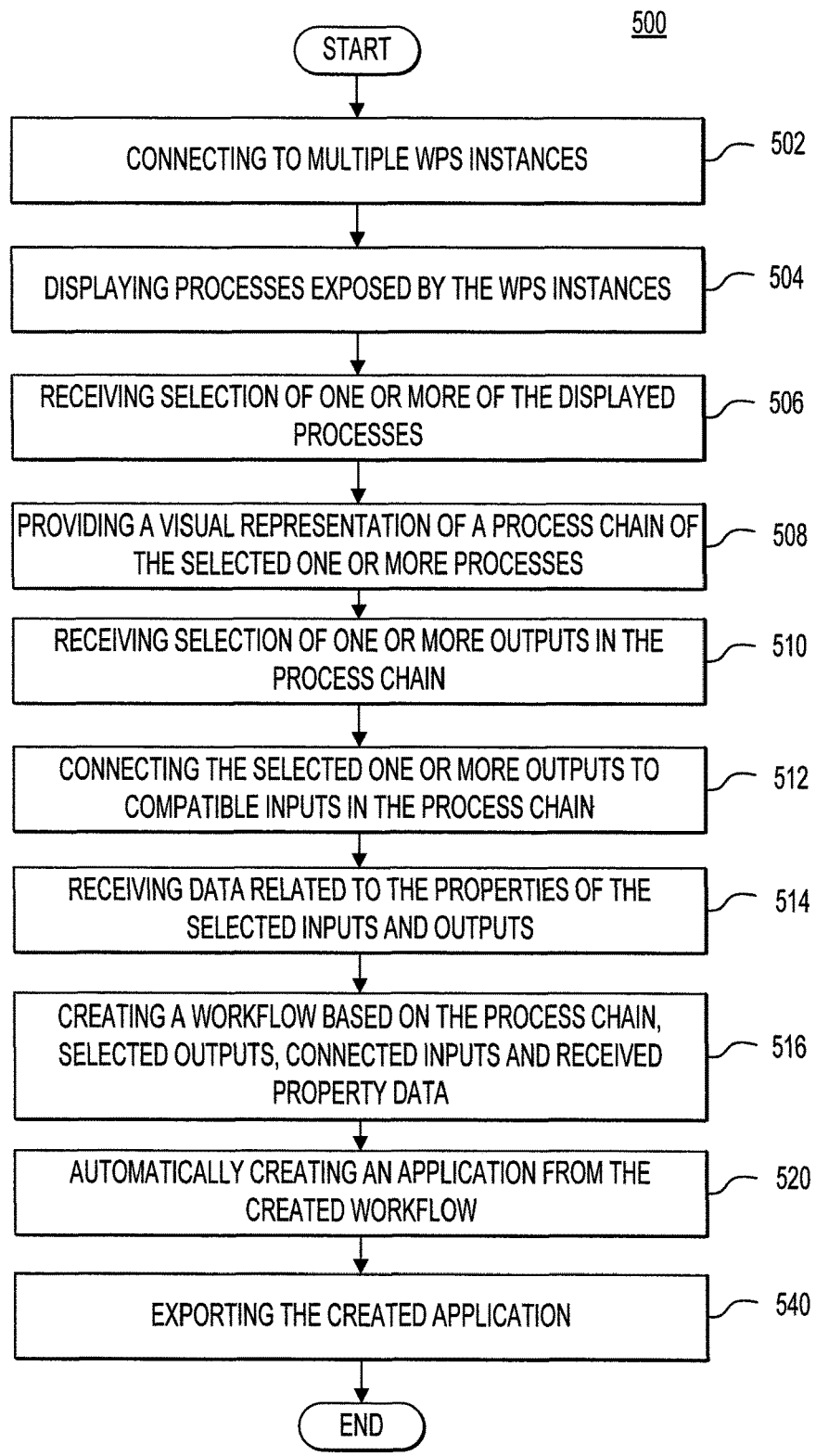
FIG. 5A is a flowchart illustrating an embodiment of a method for automated WPS workflow building and application creation.

With reference now to FIG. 5A, shown is a flowchart illustrating an embodiment of a method 500 for automated WPS workflow building and application creation. Method 500 comprises: connecting to multiple WPS instances, block 502; displaying processes exposed by the WPS instances, block 504; receiving selection of one or more of the displayed processes, block 506; providing a visual representation of a process chain of the selected one or more processes, block 508; receiving selection of one or more outputs in the process chain, block 510; connecting the selected one or more outputs to compatible inputs in the process chain, block 512; receiving data related to the properties of the selected inputs and outputs, block 514; creating a workflow based on the process chain, selected outputs, connected inputs and received property data, block 516; creating an application from the created workflow, block 520; and exporting the created application, block 540. In connecting 502, method 500 connects to servers with available WPS processes (WPS services). In an embodiment, the processpanelviewmodel 160 may perform the connecting 502. Displaying 504 displays the WPS processes uploaded form the WPS servers. DiagramViewModel 140 may perform the displaying 504. Receiving selection 506 receives user inputs selecting one or more of the displayed WPS processes. Providing 508 displays a representation of a chain of the selected WPS processes. Received selection of one or more outputs 510 receives the user selection of outputs of display processes. Connecting the selected outputs 512 connects the selected outputs to compatible inputs of other WPS processes thereby linking WPS processes together in the process chain. Receiving data 514 received the data corresponding to the selected inputs and outputs. The linking of WPS processes 512 and the receiving of data 514 are performed by the ProcessViewModel 120, MultiInputViewModel InputViewmodel, Outputviewmodel, and PropertiesViewModel and the received data is stored in the model 110. Creating 516 processes the user connections, inputs, and changes to create a valid workflow (e.g., ensures that the outputs provide valid inputs to their linked inputs). Automatically creating an application 520 is shown in more detail in FIG. 5B. In an embodiment, ModelBuilder Web Service 330 (i.e., exporting service) performs the automatically creating 520 and exporting application 540. It is noteworthy that the automatically creating 520 and exporting 540 export a ready-to-use application without the need for additional code or user input.

Figure 5B:
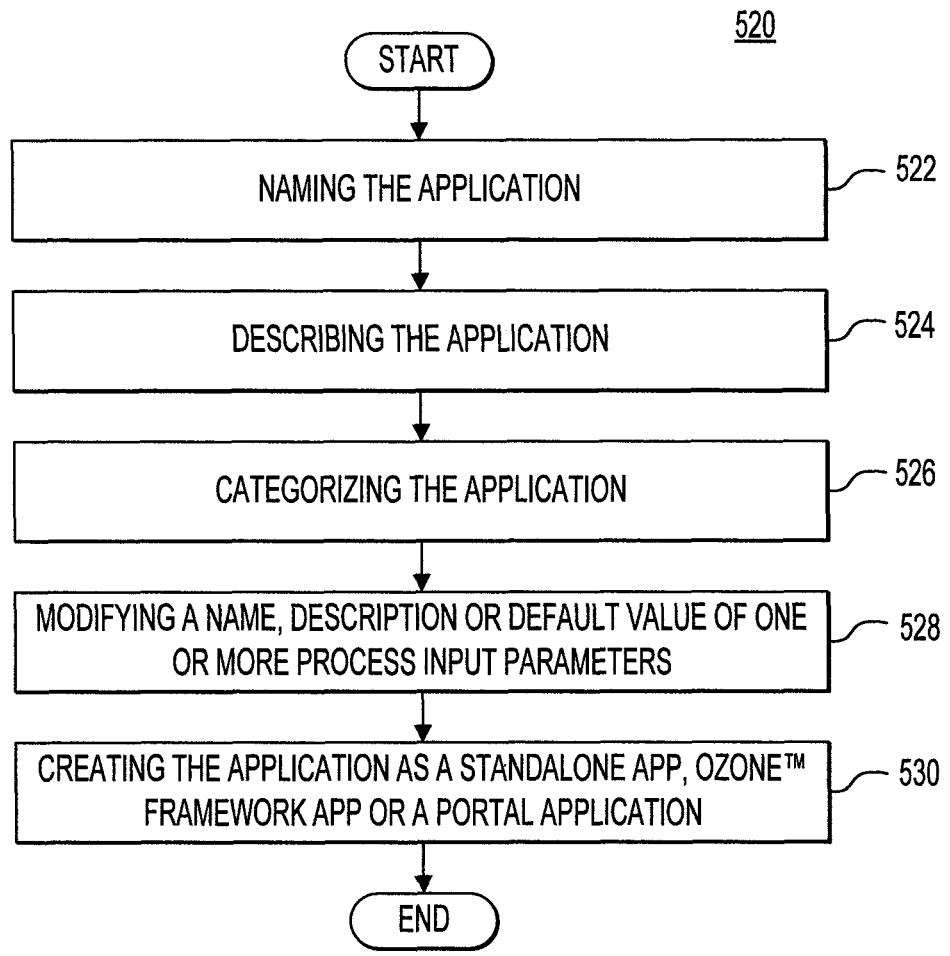
FIG. 5B is a flowchart illustrating an embodiment of a method for application creation.

With reference now to FIG. 5B, shown is a flowchart illustrating an embodiment of the method 520 for application creation. Method 520 comprises: naming the application, block 522; describing the application, block 524; categorizing the application, block 526; modifying a name, description or default value of one or more process input parameters, block 528 (see, e.g., export application 320 in FIG. 3); and creating the application as a standalone app, Ozone™ framework app, or a portal application, block 530. As noted above, these types of applications are merely examples of application platforms for which embodiments can generate applications. In an embodiment and as stated above, the export service described above (e.g., ModelBuilder Web Service 330) performs method 520 and exporting 540.

Figure 6:
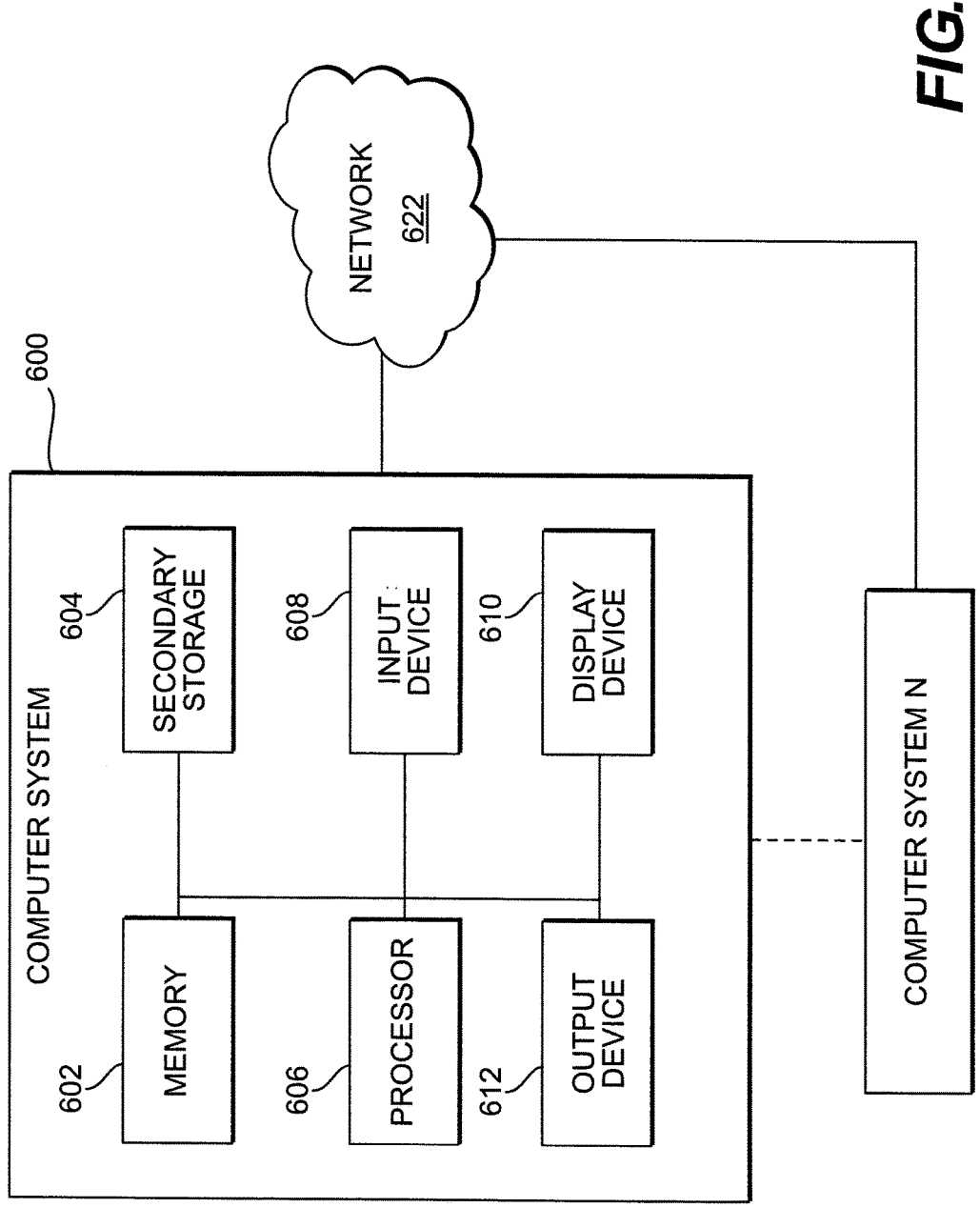
FIG. 6 is a block diagram illustrating exemplary hardware components for implementing embodiments of a system and method for automated WPS workflow building and application creation.

With reference now to FIG. 6, shown is a block diagram illustrating exemplary hardware components for implementing embodiments of system and method for automated WPS workflow building and application creation. Computer system 600, including client-servers combining multiple computer systems, or other computer systems similarly configured, may include and execute one or more subsystem components to perform functions described herein, including steps of methods and processes described above. Computer system 600 may connect with network 622, e.g., Internet, or other network, to receive inquires, obtain data, and transmit information and incentives as described above.

Computer system 600 typically includes a memory 602, a secondary storage device 604, and a processor 606. Computer system 600 may also include a plurality of processors 606 and be configured as a plurality of, e.g., bladed servers, or other known server configurations. Computer system 600 may also include an input device 608, a display device 610, and an output device 612. Memory 602 may include RAM or similar types of memory, and it may store one or more applications for execution by processor 606. Secondary storage device 604 may include a hard disk drive, floppy disk drive, CD-ROM drive, or other types of non-volatile data storage. Processor 606 executes the application(s), such as subsystem components, which are stored in memory 602 or secondary storage 604 or received from the Internet or other network 622. The processing by processor 606 may be implemented in software, such as software modules, for execution by computers or other machines. These applications preferably include instructions executable to perform the system and subsystem component (or application) functions and methods described above and illustrated in the FIGS. herein. The applications preferably provide graphical user interfaces GUIs) through which users may view and interact with subsystem components (or application in mobile device).

Computer system 600 may store one or more database structures in secondary storage 604, for example, for storing and maintaining databases, and other information necessary to perform the above-described methods. Alternatively, such databases may be in storage devices separate from subsystem components.

Also, as noted, processor 606 may execute one or more software applications in order to provide the functions described in this specification, specifically to execute and perform the steps and functions in the methods described above. Such methods and the processing may be implemented in software, such as software modules, for execution by computers or other machines. The GUIs may be formatted, for example, as web pages in HyperText Markup Language (HTML), Extensible Markup Language (XML) or in any other suitable form for presentation on a display device depending upon applications used by users to interact with the system (or application).

Input device 608 may include any device for entering information into computer system 600, such as a touchscreen, keyboard, mouse, cursor-control device, touchscreen, microphone, digital camera, video recorder or camcorder. The input device 608 may be used to enter information into GUIs during performance of the methods described above. Display device 610 may include any type of device for presenting visual information such as, for example, a computer monitor or flat-screen display (or mobile device screen). The display device 610 may display the GUIs and/or output from sub-system components (or application). Output device 612 may include any type of device for presenting a hard copy of information, such as a printer, and other types of output devices include speakers or any device for providing information in audio form.

Examples of computer system 600 include dedicated server computers, such as bladed servers, personal computers, laptop computers, notebook computers, palm top computers, network computers, mobile devices, or any processor-controlled device capable of executing a web browser or other type of application for interacting with the system.

Although only one computer system 600 is shown in detail, system and method embodiments described herein may use multiple computer system or servers as necessary or desired to support the users and may also use back-up or redundant servers to prevent network downtime in the event of a failure of a particular server. In addition, although computer system 600 is depicted with various components, one skilled in the art will appreciate that the server can contain additional or different components. In addition, although aspects of an implementation consistent with the above are described as being stored in memory, one skilled in the art will appreciate that these aspects can also be stored on or read from other types of computer program products or computer-readable media, such as secondary storage devices, including hard disks, floppy disks, or CD-ROM; or other forms of RAM or ROM. The computer-readable media may include instructions for controlling a computer system, computer 600, to perform a particular method, such as methods described above.

The contemplated modifications and variations specifically mentioned above are considered to be within the spirit and scope of the present invention.

Those of ordinary skill in the art will recognize that various modifications and variations may be made to the embodiments described above without departing from the spirit and scope of the present invention. It is therefore to be understood that the present invention is not limited to the particular embodiments disclosed above, but it is intended to cover such modifications and variations as defined by the following claims.

The invention claimed is:

1. A system for automated web processing service (WPS) workflow building and application creation comprising:
   a processor and a memory, wherein the processor executes instructions on the memory to generate a graphical user interface that includes:
   a process panel that allows a user to connect to multiple WPS server instances, search for and view processes exposed by those WPS server instances, select one or more processes in order to add the selected one or more processes to a diagram, and to enter a WPS Server uniform resource locator (URL) or select a source from a list of available servers;
   the diagram that provides a visual representation of a process chain of the selected one or more processes and that enables selection of an output of a process of the process chain in order to connect the output to a compatible input of another process;
   a property panel that displays the inputs and outputs for the process that is currently selected by the user, wherein the property panel enables the user to execute processes to preview workflow results and save a workflow created from the executed processes and other inputs; and
   a menu selection that enables a user to create an application from the workflow created using the process panel, diagram and property panel,
   wherein, in the diagram, error-checking is performed by disabling incompatible inputs when a connection line is dragged from a given output of a process of the process chain, and the user is prevented from connecting the given output to its corresponding incompatible input.

2. The system of claim 1 wherein the property panel enables the user to enter text.

3. The system of claim 1 wherein the property panel enables the user to draw on the available map for input map data.

4. The system of claim 1 wherein the property panel enables the user to select files as input.

5. The system of claim 1 wherein the property panel enables the user to choose appropriate input or output formats.

6. The system of claim 1 wherein the property panel enables the user to serialize process requests.

7. The system of claim 1 wherein the process panel includes a search tool that enables the user to search for processes.

8. The system of claim 1 wherein the process panel includes drag and drop capability to enable the user to select and add processes to the diagram.

9. A computer-implemented method for automated web processing service (WPS) workflow building and application creation comprising:
   connecting to multiple WPS instances;
   displaying processes exposed by the WPS instances;
   receiving selection of one or more of the displayed processes;
   providing a visual representation of a process chain of the selected one or more processes;
   selecting one or more outputs of the processes in the process chain;
   connecting the selected one or more outputs to compatible inputs of the other processes in the process chain, wherein the connecting includes error-checking by disabling inputs when a connection line is dragged from a given output and preventing connecting the given output to a corresponding disabled input;
   receiving data related to the properties of the selected inputs and outputs;
   creating a workflow based on the process chain, selected outputs, connected inputs and received property data;
   creating an application from the created workflow; and
   exporting the created application.

10. The computer-implemented method of claim 9 wherein the creating an application includes naming the application.

11. The computer-implemented method of claim 9 wherein the creating an application includes describing the application.

12. The computer-implemented method of claim 9 wherein the creating an application includes categorizing the application.

13. The computer-implemented method of claim 9 wherein the creating an application includes modifying a name, description, or default value of one or more process input parameters.

14. The computer-implemented method of claim 9 wherein the creating an application includes creating the application as a standalone app.

15. The computer-implemented method of claim 9 wherein the creating an application includes creating the application as a portal application.

16. The computer-implemented method of claim 9 wherein the creating an application includes:
   naming the application; describing the application; categorizing the application;
   modifying a name, description, or default value of one or more process input parameters; and
   creating the application as a standalone app or a portal application.

17. A non-transitory computer readable medium storing instructions, executable by a processor, for automated web processing service (WPS) workflow building and application creation, by:
   connecting to multiple WPS instances;
   displaying processes exposed by the WPS instances;
   receiving selection of one or more of the displayed processes;
   providing a visual representation of a process chain of the selected one or more processes;
   selecting one or more outputs of the processes in the process chain;
   connecting the selected one or more outputs to compatible inputs of the other processes in the process chain, wherein the connecting includes error-checking by disabling inputs when a connection line is dragged from a given output and preventing connecting the given output to a corresponding disabled input;
   receiving data related to the properties of the selected inputs and outputs;
   creating a workflow based on the process chain, selected outputs, connected inputs and received property data;
   creating an application from the created workflow; and
   exporting the created application.

18. The non-transitory computer readable medium of claim 17 wherein the creating an application includes:
   naming the application; describing the application; categorizing the application;
   modifying a name, description, or default value of one or more process input parameters;
   and
   creating the application as a standalone app or a portal application.

* * * * *